United States Patent

[11] 3,579,032

[72] Inventor Robert B. Jacobs
 Homewood, Ill.
[21] Appl. No. 752,277
[22] Filed Aug. 13, 1968
[45] Patented May 18, 1971
[73] Assignee Standard Oil Company
 Chicago, Ill.

[54] PROCESS FOR IMPROVING THE OLEOPHILIC PROPERTY OF POLYMERS
 4 Claims, 3 Drawing Figs.
[52] U.S. Cl. ................................................... 317/2,
 117/4
[51] Int. Cl. ............................................... H05f 3/06
[50] Field of Search ............................................ 317/2;
 117/4, 167

[56] References Cited
 UNITED STATES PATENTS
 2,997,405 8/1961 Huck............................ 117/4
 3,383,560 5/1968 Ginsburgh..................... 317/2

Primary Examiner—J. D. Miller
Assistant Examiner—Harry E. Moose, Jr.
Attorneys—Arthur G. Gilkes, William T. McClain and John J. Connors ABSTRACT: This invention concerns a process for improving the oleophilic property of polymers, particularly polyethylene, and comprises shaving off the external layer of a polymer in the presence of a hydrocarbon cutting material. Shaving the polymer in this manner presents a new surface which is readily wet by hydrocarbons.

Patented May 18, 1971  3,579,032

INVENTOR.
Robert B. Jacobs
BY
ATTORNEY

3,579,032

PROCESS FOR IMPROVING THE OLEOPHILIC PROPERTY OF POLYMERS

BACKGROUND OF THE INVENTION

In general, hydrocarbons wet polymers, but the degree of wetting is not always acceptable. For example, a static charge neutralizer having a hollow polymer core may not reduce to the desired degree the static charge carried by hydrocarbon fuel if the fuel does not properly wet the core. A static charge neutralizer is a tubular capacitor comprising an outer conductive plate and an inner hollow polymer core. A plurality of sharply pointed, grounded electrodes protrude into the open center of the core, and, as the fuel flows through the core, these electrodes inject into the fuel neutralizing charges. If the fuel does not thoroughly wet the inside wall of the core, charges which collect here are not firmly held and are dislodged. As a result, a sufficiently high potential between the points of the electrode and the body of the fuel will not develop, and the electrodes do not discharge a sufficient number of neutralizing charges into the fuel.

A polyolefin pickup drum used by an oil skimmer also demonstrates improved operability as its hydrocarbon wettability increases. An oil skimmer removes surface oil from large bodies of water such as lakes and streams by contacting a rotating pickup drum having a polyolefin surface with oil floating on the top of the lake or stream. The oil adheres to the polyolefin surface, and the rotating drum lifts the oil off the surface of the water. A scraper in tangential contact with the rotating drum strips the oil from the polyolefin surface. Obviously, when the polyolefin surface readily attracts and holds oil, the oil skimmer operates most efficiently and reliably.

BRIEF DESCRIPTION OF THE INVENTION

I have discovered that the oleophilic property of polymers is improved by machining the surface of the polymer and applying a hydrocarbon cutting material to the freshly machined surface. Machining is usually accomplished by means of a cutting tool which shaves the surface of the polymer. The type of hydrocarbon with which one wishes to wet the polymer surface controls the selection of the hydrocarbon cutting material. For example, if one wishes to make a polyolefin surface more receptive to kerosene, or hydrocarbons similar to kerosene, the cutting material used should be kerosene.

Although the use of hydrocarbon cutting material for machining metals is well known, it is surprising to discover that machining a polymer in the presence of a hydrocarbon cutting material improves the oleophilic property of the polymer. Machining purges the polymer surface of other materials which are tightly held and which tend to repel hydrocarbons. But machining alone is not enough—the hydrocarbon cutting material must contact the machined surface. Preferably, contacting should take place at the moment when the fresh surface is first exposed and before this surface is exposed to an oleophobic environment, for example, a moisture laden atmosphere. I have noticed that, if a machined polymer is exposed to the atmosphere for several hours before it is covered with the hydrocarbon, the oleophilic property of the polymer is not improved.

Although I do not completely understand all the reasons why my process enhances the oleophilic property of the polyolefin, I believe an important one is because the molecules of the hydrocarbon cutting material attach themselves more strongly to freshly severed polymer molecules than they do to polymer molecules which have been exposed to water or other polar materials. During machining, the cutting tool shaves off the external polymer layer, severing a large number of polymer molecules. Such severed molecules are highly reactive, probably having free radicals available which react with the hydrocarbon cutting material. Thus, a chemical bond forms between hydrocarbon molecules and severed polymer molecules, and the machined polymer surface will have a monomolecular layer of hydrocarbon firmly adhering to it. Because of the affinity of like materials for each other, other hydrocarbons similar to the cutting materials wet this machined surface with ease. In the absence of the hydrocarbon cutting material, the monomolecular layer that forms is one of chance, and it rarely is as compatible with hydrocarbons as is the specified hydrocarbon cutting material.

DESCRIPTION OF THE PREFERRED EMBODIMENTS

Figure 1:
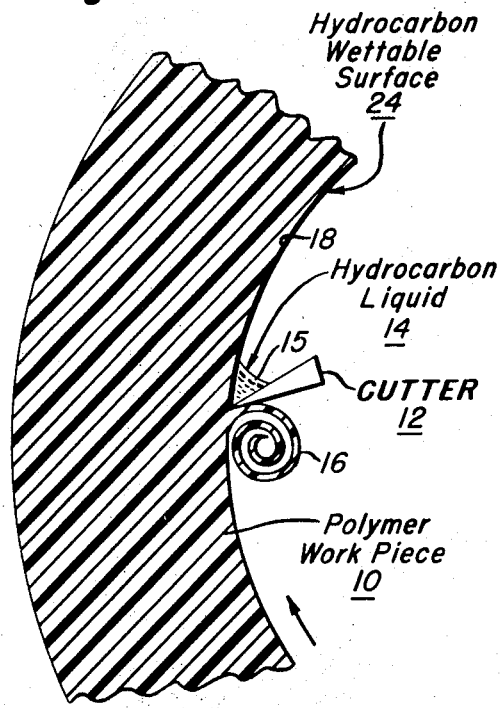
FIG. 1 is an enlarged view schematically illustrating the shaving of a polymer workpiece in the presence of a hydrocarbon cutting material.

FIG. 1 shows a polymer workpiece 10 being shaved by a cutter 12 in the presence of a hydrocarbon cutting liquid 14. The workpiece 10, mounted on a lathe (not shown), rotates in a clockwise direction as indicated by the arrow. The cutter 12 engages the external surface 16 of the rotating workpiece 10 and shaves surface 16 off, exposing the internal portion 18 of the workpiece 10 and presenting a new surface 24. The hydrocarbon cutting liquid 14, forming a pool 15 between the cutter 12 and the internal portion 18, immediately contacts the newly exposed surface 24. The amount of polymer shaved off the workpiece 10 is unimportant. Only contacting the surface 24 with the hydrocarbon cutting liquid 14 is important.

I believe the molecules of the cutting liquid 14 chemically attach themselves to the internal portion 18 to form a monomolecular layer of hydrocarbon which covers surface 24. In any event, the newly exposed surface 24 now has an improved oleophilic property. That is, it is readily wet by hydrocarbon liquids, and it holds these liquids tightly.

Figure 2:
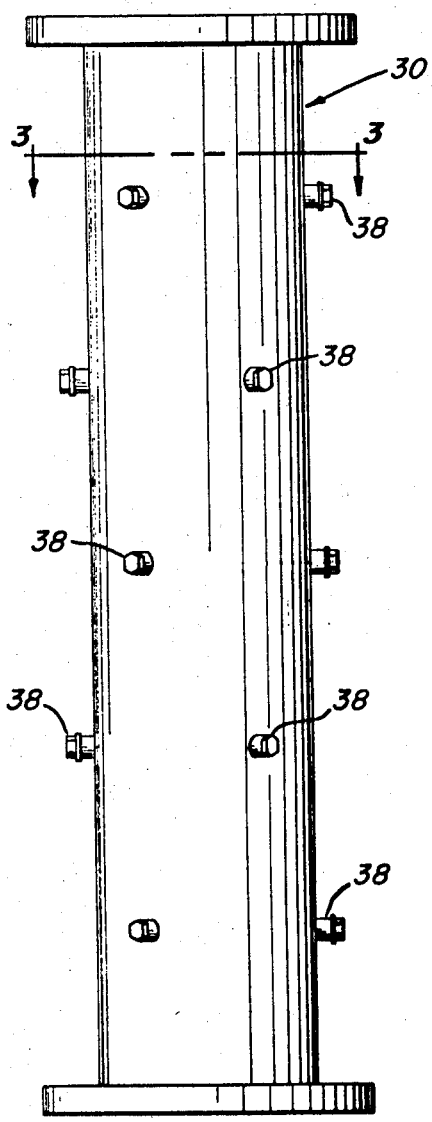
FIG. 2 is an elevational view of a static charge neutralizer employing a polymer core having an inner wall treated in accordance with this invention.
Figure 3:
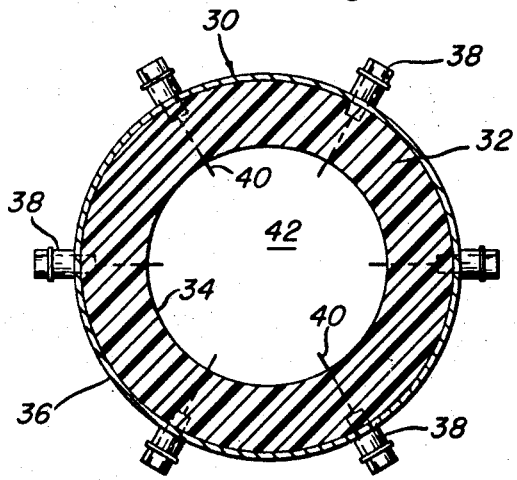
FIG. 3 is a cross-sectional view taken along line 3-3 of FIG. 2.

FIGS. 2 and 3 show a static charge neutralizer 30 which employs a hollow dielectric core 32 having an inside wall 34 treated as illustrated in FIG. 1. The dielectric core 32 is inserted inside a grounded metal tube 36, and is bonded to the inside of the tube 36. A plurality of sharply pointed, spaced electrodes 38 disposed about the periphery of the tube 36 protrude through the tube 36 and the dielectric core 32. The points 40 of these electrodes 38 contact charged hydrocarbon liquids flowing through the opening 42 in the core 32. These points 40 inject into the charged hydrocarbon liquid neutralizing charges which are opposite in polarity to the charge carried by the hydrocarbon liquid. For a more detailed description of the operation and construction of the static charge neutralizer 30, refer to U.S. Pat. No. 3,383,560.

Polyethylene is the preferred core material, and kerosene is the preferred cutting liquid. Kerosene is employed because the static charge neutralizer is used mostly to neutralize the charge carried by hydrocarbons similar to kerosene. Machining wall 34 in the presence of kerosene renders wall 34 highly receptive to any kerosene or kerosenelike hydrocarbon flowing through the neutralizer 30. If the inside wall 34 is not treated, the neutralizer 30 will not always perform reliably. Machining wall 34, as described, always enables the neutralizer 30 to reduce to a safe level the charge carried by hydrocarbon fuels.

The operation of a static charge neutralizer was observed using treated and untreated polyethylene cores. A hydrocarbon fuel was pumped through the neutralizer at a rate of 400 gallons per minute, and the charge carried by the fuel was measured as the fuel entered and left the neutralizer. Results, reported in microamperes, are set forth on the following table.

TABLE

| Example | Untreated core | | Treated core | |
|---|---|---|---|---|
|  | Entering | Leaving | Entering | Leaving |
| 1 | −7.6 | −.60 | −6.5 | −.11 |
| 2 | −6.9 | −.44 | −6.1 | −.06 |
| 3 | −6.2 | −.32 | −6.9 | −.22 |
| 4 | −6.9 | −.68 | −7.0 | −.01 |
| 5 | −3.3 | −.28 | −7.6 | +.18 |

A reduction of the static charge to a value between −0.25 and +0.25 microamperes per 400 gallons per minute is considered a safe level. Ideally, as the fuel leaves the neutralizer, the charge will be zero. As seen in the table, when the polyolefin core is treated according to my process, a safe level is readily achieved.

Although I have described my process with reference to only one preferred embodiment, my process of improving the oleophilic property of polymers has a wide variety of applications and is not intended to be limited exclusively to the single application illustrated. For example, polyethylene drums used by oil skimmers can also be treated as I described to enhance oil wettability. My process may also be varied in many ways. For example, polyolefins such as polypropylene and polystyrene may be treated in a like manner, and hydrocarbon cutting liquids other than kerosene may be used.

I claim:

1. In the process of reducing electrostatic charges in an electrically charged hydrocarbon liquid, said process including the steps of flowing said charged liquid through a tubular capacitor having an outer electrically conductive ground plate and an inner hollow dielectric core made of a polymer, said core having an inside wall which serves as the other plate of the capacitor, and contacting said liquid with a plurality of spaced, sharply pointed grounded electrodes while said liquid is confined within the said core, the improvement comprising:
   treating said inside wall so that the hydrocarbon liquid readily wets said wall, said treating comprising machining said wall in the presence of a hydrocarbon cutting material.

2. The improved process defined in claim 1 wherein said polymer is polyethylene and said cutting material is kerosene.

3. In an apparatus for reducing electrostatic charges in an electrically charged hydrocarbon liquid, said apparatus including a tubular capacitor having an outer electrically conductive ground plate and an inner hollow dielectric core made of a polymer, said core having an inside wall which serves as the other plate of the capacitor, and a plurality of spaced, sharply pointed grounded electrodes protruding into said hollow core, whereby the charged liquid flowing through said core contacts said points, the improvement comprising:
   said inside wall being treated so that the hydrocarbon liquid more readily wets said wall, said treatment comprising the step of machining said wall in the presence of a hydrocarbon cutting material.

4. The apparatus defined in claim 3 wherein said polymer is polyethylene and said hydrocarbon cutting material is kerosene.